United States Patent [19]
Birk

[11] Patent Number: 5,592,612
[45] Date of Patent: Jan. 7, 1997

[54] METHOD AND APPARATUS FOR SUPPLYING DATA STREAMS

[76] Inventor: Yitzhak Birk, c/o Thaler 35 Castenada, San Francisco, Calif. 94116

[21] Appl. No.: 431,189

[22] Filed: Apr. 28, 1995

[51] Int. Cl.[6] .......................... G01R 31/28; G06F 11/00
[52] U.S. Cl. ............................... 395/182.04; 348/7
[58] Field of Search ..................... 395/182.04, 182.01, 395/181; 358/342; 348/7

[56] References Cited

U.S. PATENT DOCUMENTS

| | | | |
|---|---|---|---|
| 4,543,628 | 9/1985 | Pomfret | 364/200 |
| 4,942,579 | 7/1990 | Goodlander | 371/51 |
| 5,072,378 | 12/1991 | Manka | 395/182.04 |
| 5,202,979 | 4/1993 | Hillis | 395/182.04 |
| 5,278,838 | 1/1994 | Ng | 395/182.04 |
| 5,367,669 | 11/1994 | Holland | 395/575 |
| 5,414,455 | 5/1995 | Hooper | 348/7 |
| 5,442,390 | 8/1995 | Hooper | 348/7 |
| 5,455,934 | 10/1995 | Holland | 395/404 |
| 5,463,765 | 10/1995 | Kakuta | 395/182.04 |

FOREIGN PATENT DOCUMENTS 0645929  3/1995  European Pat. Off. .......... H04N 5/92

OTHER PUBLICATIONS

Pete McLean, "An Introduction to RAID", Apr. 24 1991, pp. 15–18.
Golubchik et al., Chained DeClustering: Load Balancing and Robustness to Skew & Failures, IEEE Research Issues in Data Engineering 1992 Workshop, pp. 88–95.
Kradler, Jr. et al., Disk I/O, A Study in Shifting Bottlenecks, IEEE Proceedings of the 1990 Winter Simulation Conference, pp. 826–830.
Y. Azar, A. Z. Broder, A. R. Karlin and E. Upfal, "Balanced Allocations", Proceedings of ACM Symposium on the Theory of Computing, 1994.
M. O. Robin, "Efficient Dispersal of Information for Security, Load Balancing and Fault Tolerance", J. ACM, vol. 36, No. 2, Apr., 1989, pp. 335–348.
Y–D Lyuu, "Fast Fault Tolerant Parallel Communication and On–Line Maintenance Using Information Dispersal", Proc. ACM Symp. on Parallel Algorithm and Architectures (SPAA), pp. 378–387, 1990.

*Primary Examiner*—Robert W. Beausoliel, Jr.
*Assistant Examiner*—Glenn Snyder

[57] ABSTRACT

A sewer system for storing and supplying data to a destination. The server system includes a plurality of disk drives for storing data, a buffer memory for temporarily storing a portion of the data from the disk drives which is soon to be supplied, a reconstruction unit for reconstructing a portion of the data from at least one of the disk drives using a portion of the data from a plurality of the remaining disk drives so that at least one of the disk drives holding data belonging to the current parity group can be bypassed (either because that disk is faulty or because there are already many queued read-requests for it), a control unit for controlling the server system, and an output unit for outputting data from either or both of the buffer memory and the reconstruction unit. The server system prevents congestion problems from persisting, reduces buffering requirements, and provides load balancing and fault tolerance. Preferably, the server system is a video storage server and the data being stored is video data. Methods of storing data to and retrieving data streams from the disk drives are also disclosed.

22 Claims, 5 Drawing Sheets

| n+2 | n+3 | n+4 | n+5 |     | n+7 |
|-----|-----|-----|-----|-----|-----|
| n+1 | n+2 | n+3 | n+4 | n+5 | n+6 |
| n   | n+1 | n+2 | n+3 | n+4 | n+5 |
| n-1 | n   | n+1 | n+2 | n+3 | n+4 |

*FIG. 5*

| n+5 |     |     |     |     |     |
|-----|-----|-----|-----|-----|-----|
| n+4 | n+5 |     |     |     |     |
| n+3 | n+4 | n+5 |     |     |     |
| n+2 | n+3 | n+4 | n+5 |     | n+7 |
| n+1 | n+2 | n+3 | n+4 | n+5 | n+6 |
| n   | n+1 | n+2 | n+3 | n+4 | n+5 |
| n-1 | n   | n+1 | n+2 | n+3 | n+4 |

*FIG. 6*

METHOD AND APPARATUS FOR SUPPLYING DATA STREAMS

BACKGROUND OF THE INVENTION

1. Field of the Invention

The present invention relates to a video storage server, and more particularly, to a video-on-demand storage server which supports a large number of concurrent streams of data.

2. Description of the Related Art

Video-on-demand (VOD) storage servers include multiple magnetic disk drives and are required to support a large number of concurrent streams of data. With compressed video data, the rate of each stream is several times lower than the sustained transfer rate of a single magnetic disk drive. Since the cost of storage devices is a large portion of the cost of the VOD storage server, and the large number of concurrent streams often makes the storage subsystem bandwidth-limited rather than capacity-limited, it is desirable to make the most efficient use of the disk drives so as to minimize the cost per unit storage. Consequently, the throughput of the server is an important design goal.

Generally speaking, VOD storage servers typically operate by reading "chunks" of data from magnetic disk drives into a buffer memory, and then sending the content of the buffer memory in small "cells" to a destination over a communication network. The sending of the small "cells" is referred to as "streaming." The rate of cells per video stream is dictated by the rate for that stream. Once a user begins viewing a stream of data, the server must not overrun the amount of the available buffering when reading additional data, nor should the buffer memory be allowed to become empty. In effect, the buffer memory "smooths" the data transfer from the magnetic disks to the communication network.

With video data, the semiconductor storage memory required for buffering is another large portion of the overall cost of the VOD storage server. Hence, it is an important design goal to keep down the amount of required buffer memory. Data placement on a magnetic disk and the scheduling of retrieval of that data into buffer memory are therefore also important considerations in the design of the VOD storage servers. Specifically, placement and scheduling determine the maximum number of concurrent streams, the response time to user requests, as well as the amount of buffering required to mask the variability in the rate at which chunks for any given stream are actually retrieved from the magnetic disks and the difference between the disk and stream rates.

The use of storage systems for video data differs significantly from the use of storage systems in other applications. For example, in scientific computing or medical imaging systems, disk arrays are used to meet the single-stream rate requirements. As another example, when disks are used in on-line transaction processing, the number of accesses to small, unrelated blocks of data per unit time is most important, with "smoothness" not having any meaning and data throughput being of secondary importance.

In VOD storage systems, cost, throughput and smoothness are important design considerations. In order to be able to utilize the transfer bandwidth of all disk drives regardless of the viewing choices made by the users, as well as for other reasons, it is common practice to "stripe" each movie across many, often all, the disk drives. This entails recording a first chunk of a movie on a first disk drive, the next chunk on the next one, etc., eventually returning to the first one and beginning another round. Striping is well known and has been used both for "load balancing" and to maximize the transfer rate for a single large request. The size of a chunk is chosen so as to keep the fraction of time during which a disk can actually transfer data (as opposed to moving the reading head) high. Increasing the chunk size, however, increases the required size of the buffer memory and may also result in a longer response time to new user requests.

The use of a large number of disk drives gives rise to the problem of system unavailability due to disk failure. This problem is aggravated by the striping of the data across the disk drives, since the failure of any single disk renders all data useless. A solution to this problem is to add one additional disk drive, and record on it the "parity" of the data in the other disks. This solution is known in the art as RAID (redundant array of inexpensive disks). For example, consider the first bit of every disk drive. If the number of "1" 's is odd, a "1" would be recorded in the first bit position of the parity disk; otherwise, a "0" would be recorded. The process is similar for the other bits on the drives. In the event of a disk failure, and assuming that the identity of the failing disk drive is known, each of the bits the failed disk contained can be reconstructed from the corresponding bits of the remaining disk drives, by using the same process that was originally used to construct the parity bits, with the roles of the parity drive and the failing drive reversed.

To permit operation with a bad disk, an entire stripe must be read into memory to permit quick reconstruction of the bad disk's data from that of operational ones. Doing so is natural in many applications, since the data of the entire stripe is needed by the computer for processing. A typical size of a data chunk corresponds to several tenths of a second of video playing time. Consequently, reading a large number of chunks into a buffer memory merely because they belong to the same stripe would tie up large amounts of memory per stream for a long time. Specifically, the amount of memory per stream would be proportional to the number of disk drives forming a parity group. Since the number of streams that a server can produce concurrently is proportional to the number of disk drives, the total amount of memory required to buffer streams could increase quadratically with the number of disks. Since a server may contain tens or even hundreds of disks, this would be disastrous. Having to read an entire stripe into memory is thus a major problem for a video server.

The RAID approach has been modified in recent years to obtain greater performance. Even so, RAID and its modifications still suffer from serious disadvantages.

One modification to RAID is called staggered access. Here, the system places the data in the same manner as in conventional RAID, but the access schedules to the different disks are staggered in time. As a result, data for each stream is supplied incrementally and the buffer size per stream is a constant. One disadvantage of this approach is that it cannot effectively tolerate a disk failure. In the event of a disk failure, the approach would either require that each chunk of data be read twice (once to help reconstruct the data of the failed disk and once when its turn comes for transmission), or else the same large amount of buffer memory would be required as in the conventional RAID. Another disadvantage is the tight coupling among the access schedules to the different disks, and the persistent nature of congestion caused by coincidental user requests or small differences in the rates of different video streams. Yet another disadvantage is that rebuilding the content of the failed disk onto a new one can consume as much as the entire bandwidth of all the disks.

Another modification to RAID is known as partitioned RAIDs. Here, the M disk drives are partitioned into sets of size k+1, where k+1 divides into M. The k+1 disks of any single RAID are all accessed simultaneously, but the access schedules to the different RAIDs are staggered in time. This scheme mitigates the large buffer memory requirement if k is sufficiently small, but streaming capacity drops to (k/k+1) with a failed disk, and rebuilding can again effectively consume the entire bandwidth of the server. Also, the persistence problem mentioned for the staggered access applies here as well.

Further, all schemes with a regular data layout and no true "slack" in the choice of disks at reading time suffer from a direct translation of user-generated scenarios (the correlation between viewer actions) to storage-system scenarios (the correlation between the load on different disks). This causes congestion problems that occur to persist, and it is moreover generally impossible to prevent such problems from occurring.

Thus, there is a need for a data storage and retrieval technique that not only provides load balancing and fault tolerance, but also minimizes persistence of congestion and requires only a reasonable amount of buffering.

SUMMARY OF THE INVENTION

Broadly speaking, the invention relates to a method and system for non-regular (e.g., randomized) data layout of data titles (e.g., movies) onto disk drives, data redundancy over a subset of the disk drives, and adaptive load balancing. A storage server in accordance with the invention prevents congestion problems from persisting, reduces buffering requirements, and provides load balancing and fault tolerance. The invention can be implemented as an apparatus, system or method.

A server system for storing and supplying data according to the invention includes a plurality of disk drives for storing data, a buffer memory for temporarily storing a portion of the data from the disk drives which is soon to be supplied, a reconstruction unit for reconstructing a portion of the data from at least one of the disk drives using a portion of the data from a plurality of the remaining disk drives so that at least one of the disk drives holding data belonging to the current parity group can be bypassed (either because that disk is faulty or because there are already many queued read-requests for it), a control unit for controlling the server system (including scheduling and queues of requests), and an output unit for outputting data from either or both of the buffer memory and the reconstruction unit. Preferably, the server system is a video storage server and the data being stored is video data.

As a method, the invention can pertain to the storing of data to disk drives, the retrieving of data streams from the disk drives, or both.

A method for storing video titles (e.g., movies) to a number of disk drives according to the invention is first described. The method randomly orders the disk drives repeatedly to form a disk drive sequence, partitions a video title to be recorded into a plurality of data chunks, selects a set of equalsized, consecutive data chunks of the video title, respectively records the set of data chunks on a set of the disk drives in the disk drive sequence, determines a redundancy chunk for the set of data chunks, and records the redundancy chunk on the next disk drive in the disk drive sequence.

In general, the method entails partitioning a movie into blocks, each of which is partitioned into a number of equal-sized chunks. These chunks are recorded, in order of their appearance in the video title, on successive disks in the disk-sequence, followed by zero or more "redundant" chunks. Thus, both the chunk size, the number of chunks, and the number of redundant chunks may change from block to block. The various options for the number of redundant chunks and the ways in which they can be utilized are well known in the art of error-correcting codes.

A method for supplying data streams from disk drives according to the invention is now described. The video data (e.g., movie) from which each data stream is read is assumed to be previously stored on the disk drives, preferably according to the storage method described above. In storing the video to the disk drives, the video data is partitioned into blocks, and each block is partitioned into a set of data chunks and then stored on a set of the disk drives. In addition, at least one redundancy chunk for each set of data chunks is stored on another of the disk drives. The disk drives associated with each of the blocks of the video data form a group. The retrieval or supplying according to the invention maintains a queue of access requests for each of the disk drives, examines queue state information of the queues within a group, selectively reconstructs at least one of the data chunks of the set from the other data chunks of the set and the associated reconstruction chunk based on both the queue state information corresponding to the reconstruction chunk and the queue state information corresponding to at least one of the data chunks, and supplies the data chunks to the destination.

The invention offers numerous advantages over previous techniques for storing and retrieving data streams. The randomization in ordering of the disk drives at recording time prevents any correlation between user-induced scenarios and storage-system scenarios. Thus, even if momentary congestion occurs, it is unlikely to persist. By using a "k+1" scheme instead of replication, the storage overhead is reduced to 1/k. By being able to avoid at least the longest queue in each sequence of k, temporary congestion (due to the irregular storage pattern) can be avoided and (by not putting a new request into the longest queue) the likelihood of such temporary congestion is sharply reduced.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5 is a diagram illustrating memory buffer utilization in a case where reconstruction is not necessary; and FIG. 6 is a diagram illustrating memory buffer utilization in a case where reconstruction is utilized.

DETAILED DESCRIPTION OF THE INVENTION

The invention relates to a storage server which uses non-regular (e.g., randomized) data layout of data streams onto disk drives and data redundancy over a subset of the disk drives. Data reconstruction is performed using the redundant data to provide fault-tolerance. Also, the invention is additionally used to avoid at least one excessively long queue in any group of k queues of the (k) disks holding the data chunks of any single parity group for any given stream. This avoids occasional excessive delays caused by "random" congestion on a disk drive, thereby reducing buffer requirements. Additionally, by not placing a request in an already long queue, load balancing is improved and the likelihood of such excessively long queues existing is sharply reduced.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
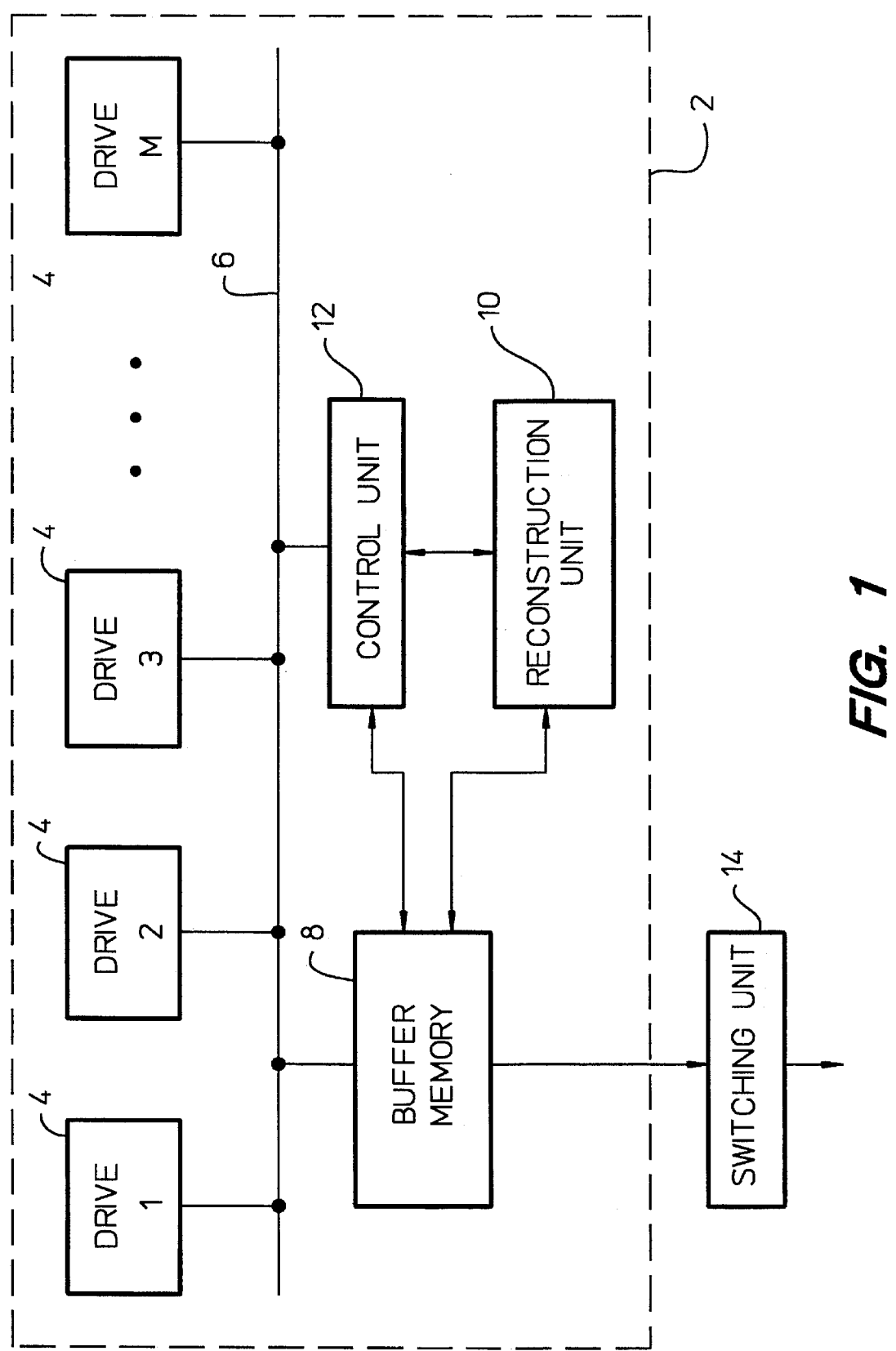
FIG. 1 is a block diagram of a video storage server according to an embodiment of the invention.

FIG. 1 is a block diagram of a storage server 2 according to an embodiment of the invention. The storage server 2 includes a plurality of storage devices (disk drives) 4, a bus 6, a buffer memory 8, a reconstruction unit 10, and a control unit 12. Although the storage devices 4 are preferably disk drives, storage devices 4 could also be random-access memory, video memory, and the like. When the storage devices 4 are disk drives, the disk drives 4 can be magnetic disk drives, optical disk drives, magneto-optical or some other type of storage drive that stores data. All that is required is that the storage capacity be partitioned into a multitude of memory units, each with a similar communication bandwidth. Contribution of the invention increases when the effective data disk transfer rate increases because the amount of data being transferred from contiguous memory addresses within the same storage unit increases.

In this embodiment, the storage server 2 is a video storage server; hence, the data being stored is video data. Each of the disk drives 4 is connected to the bus 6 which connects the disk drives 4 to the buffer memory 8 and the control unit 12. Hence, the bus 6 operates as a switching and interconnection means between the disk drives 4, the buffer memory 8, and the control unit 12. Various ways to implement the bus 6 or other switching and interconnection means will be apparent to those skilled in the art. The buffer memory 8 receives data from the disk drives 4 and outputs data to a switching unit 14. The data which is output to the switching unit 14 is thereafter transmitted to a remote location over a communication network (not shown). The reconstruction unit 10 is connected to the buffer memory 8 and the control unit 12 and operates to reconstruct chunks of the data from other associated chunks. The operation of the video server 2 is controlled by the control unit 12 which is connected to the bus 6, the buffer memory 8 and the reconstruction unit 10. Although not shown in FIG. 1, the control unit 12 maintains a queue of prioritized access requests for each of the disk drives 4. By causing the reconstruction unit 10 to reconstruct a chunk of the data from other associated chunks, the control unit 12 bypasses a particular disk. In a preferred implementation, the particular disk is bypassed because it has the longest queue delay of the disks which hold the other associated chunks. Consequently, the congestion at the particular disk is alleviated by the invention.

Reconstruction of a chunk within a parity group is preferably achieved as follows. A parity group comprises k chunks of data plus one associated parity chunk. When a data chunk is to be reconstructed, the remaining k chunks in its parity group are respectively read from k different disk drives 4 into the buffer memory 8. The k chunks are then copied, one by one in any order, into the reconstruction unit 10. The reconstruction unit 10 has a memory buffer of size equal to or exceeding the size of one chunk. Prior to reconstruction, the reconstruction unit 10 allocates an area equal to one chunk in its memory and sets all its bits to "0". Every chunk that is copied to the reconstruction unit 10 is XORed, bit by bit, with the contents of the chunk in the reconstruction unit 10. Once all k chunks have been copied in this manner, the contents of the memory buffer in the reconstruction unit 10 are identical with the chunk whose data was to be reconstructed. The reconstructed chunk is then copied back into the buffer memory 8, overwriting the parity chunk that was used in the reconstruction and which is no longer needed. If other error-correction schemes are used, the reconstruction unit 10 would be modified accordingly as would be obvious to anyone skilled in the art. Also, in different implementations of the invention, reconstruction could, for example, occur on the way from disk to buffer or from buffer to the switching unit, or within the switching unit. Finally, reconstruction in reconstruction unit 10 could take place on parts of a chunk at a time and the reconstruction of different chunks could be interleaved in time if separate reconstruction-buffers were allocated within the reconstruction unit 10.

The video storage server 2 operates to record data onto the disk drives 4 as well as to playback the data from the disk drives 4. The video storage server 2 eventually supplies data to the communications network. The operation of the video storage server 2 during both record and playback operations are described in detail below with reference to FIGS. 2–4.

Figure 2:
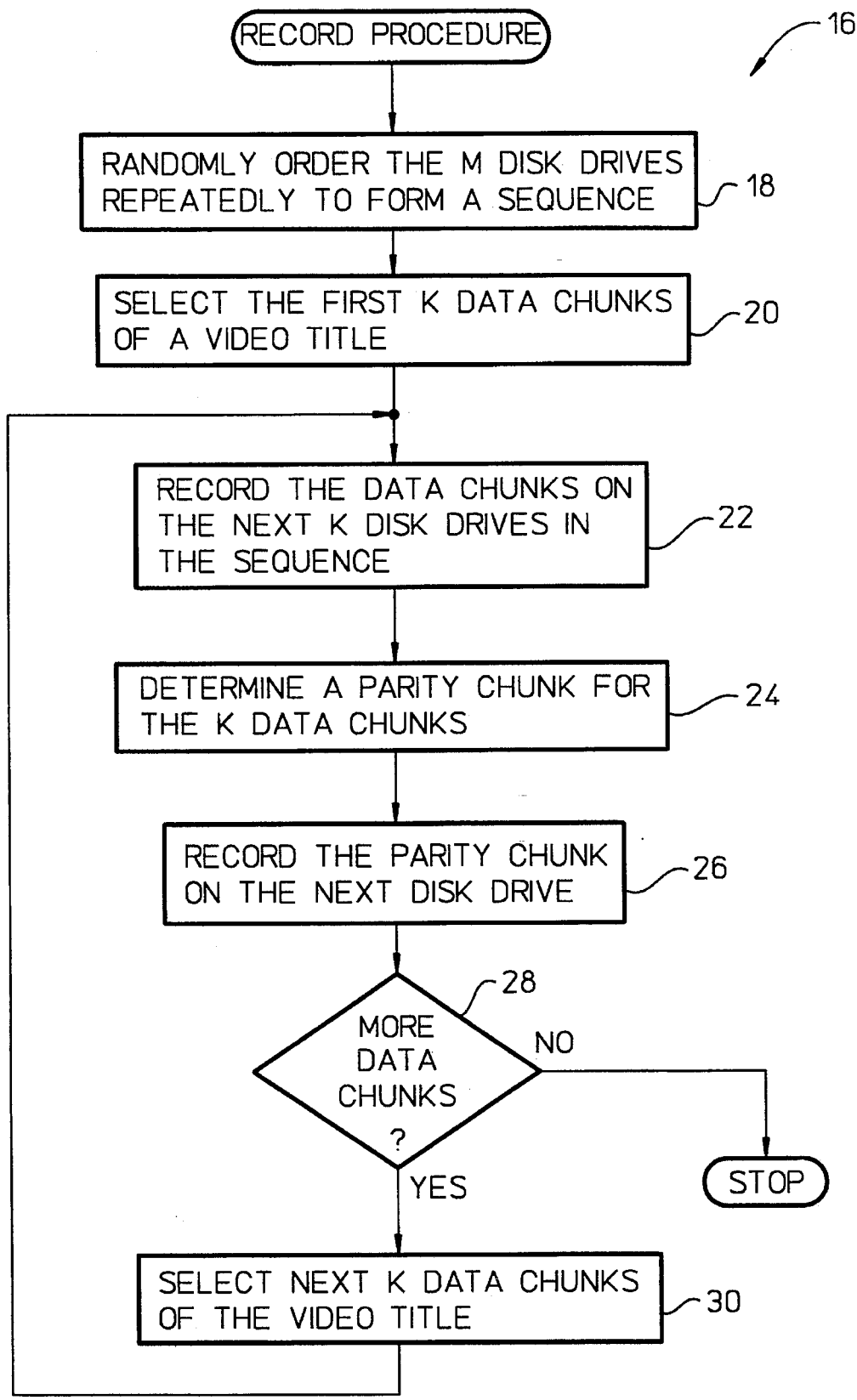
FIG. 2 is a flow chart of a recording procedure according to an embodiment of the invention.

FIG. 2 is a flow chart of a recording procedure 16 according to an embodiment of the invention. The recording procedure 16 begins by randomly-ordering 18 the M disk drives 4 repeatedly to form a disk drive sequence. For example, when the video storage server 2 has M disk drives 4, they are randomly-ordered repeatedly to form a long sequence of disk drive numbers. For example, if there are ten disk drives, the disk drive sequence would include random-orders of the ten drives repeatedly concatenated with one another to form a long sequence of disk drive numbers. There are further constraints on the ordering of disk drives: any k+1 consecutive elements of the sequence which are used to determine the location of the chunk members of any given parity group must all be different (disk numbers). This can be guaranteed, for example, by imposing a more stringent constraint whereby consecutive appearances of any given disk-drive number in the sequence of such numbers should be separated by at least k other numbers, where k+1 is the largest possible number of chunks in a parity group. Also, the disk drive sequence should be aperiodic or have a period larger than a substantial multiple of M. The ordering is not restricted to form concatenated permutations of all disk disk-drive numbers, so long as each drive appears an essentially equal number of times in a range of a reasonably small integer multiple of M. Compliant sequences can be created either by random choice followed by modifications that make them adhere to the constraint, or by using "code sequences" known in the art of coding theory. The video storage server 2 can use almost any number of disk drives 4 so long as there are at least k+1 drives 4. Preferably, there are at least 3k disk drives 4.

Next, the first k consecutive data chunks of a video title (e.g., movie) to be recorded are selected 20. Preferably, the video title to be recorded is partitioned into blocks of data, and then each block is further partitioned into a number of data chunks. Within a block of data the chunks are equisized, but different blocks can have different chunk sizes as well as a different k. In any case, for ease of explanation, it is hereafter assumed that the chunks are equisized. The selected data chunks are then recorded 22 on the first k disk drives in the disk drive sequence. Namely, the first data chunk is stored on the first disk drive in the sequence, the second data chunk is stored on the second disk drive in the sequence, etc. Once the k data chunks are recorded 22 on the k disk drives, a parity chunk for the k data chunks is determined 24, and then recorded 26 on the $k+1^{th}$ disk drive. For example, if k=3, the fourth disk drive in the sequence would store the parity chunk for the first, second and third data chunks. Error-correcting techniques for determining 24 a parity chunk from other data chunks using a parity encoding scheme are well known.

Thereafter, a decision 28 is made based on whether or not there are additional data chunks to be recorded. If not, the record procedure 16 is completed. On the other hand, if there are additional data chunks to be recorded, then the next k data chunks of the video title are selected 30 and blocks 22–26 are repeated in a similar fashion using the next group of k data chunks, except that the next k disk drives in the disk drive sequence are used.

A chunk can be recorded at an arbitrarily-chosen vacant location within the chosen disk. In one good embodiment, the recording of all data chunks of a parity group would take place at the same respective location on all disks. It is also preferred that, within a disk, the chunks of video data (e.g., movie) be recorded in contiguous locations on the disk. In another and perhaps preferred embodiment, recording on a disk would be according to a Track-Pairing scheme employed with a granularity of parity groups. The Track-Pairing scheme is described in U.S. Ser. No. 08/128,418 or EPO patent publication 0 645 929 A2 which are hereby incorporated by reference.

Figure 3:
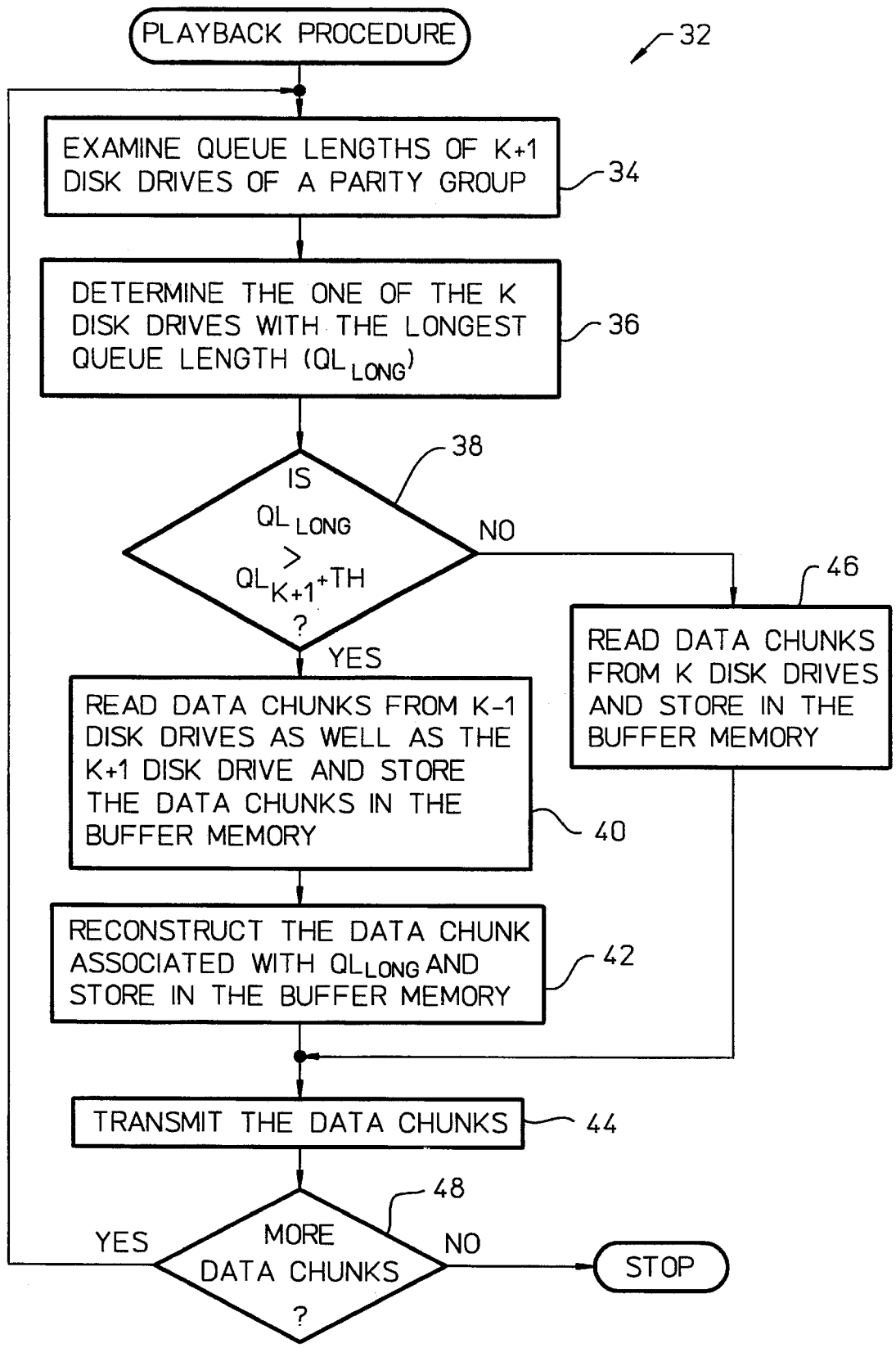
FIG. 3 is a flow chart of a playback procedure according to an embodiment of the invention.

FIG. 3 is a flow chart of a playback procedure 32 according to an embodiment of the invention. The playback procedure 32 begins by examining 34 queue lengths of k+1 disk drives that hold the data chunks comprising a first parity group for the desired stream. A parity group includes k disk drives, each of which stores a chunk of data associated with a block of data of the video data, and $k+1_{th}$ disk drive which stores the parity chunk associated with the block of the video data.

Next, the playback procedure 32 determines 36 the one of the k disk drives holding data chunks which has the longest queue length ($QL_{LONG}$). The queue with the longest queue length is the queue with the most congestion. A decision 38 is then made based on the longest queue length ($QL_{LONG}$) and the queue length of the parity ($k+1^{th}$) disk drive. In particular, if the longest queue length ($QL_{LONG}$) exceeds the queue length of the parity ($k+1^{th}$) drive plus a predetermined threshold amount, then the performance of the video storage server 2 can be enhanced by the invention. When this condition is true, data chunks are read 40 from k disk drives 4 excluding the one whose queue length equals ($QL_{LONG}$) as well as the $k+1^{th}$ disk drive 4 and stored in the buffer memory 8. Notice in this case that the data chunk from the congested disk drive 4 is not read. The data chunk associated with the disk drive 4 having the longest queue length ($QL_{LONG}$) is reconstructed 42 and stored in the buffer memory 8. Hence, the reconstructed data chunk is used instead of the data chunk from the congested disk drive 4 which was not read. By bypassing the disk drive 4 having the longest queue length ($QL_{LONG}$), the queue with the most congestion no longer hinders the performance of the video storage server 2.

On the other hand, when the decision 38 indicates that the longest queue length ($QL_{LONG}$) is not greater than the queue length of the parity ($k+1^{th}$) drive plus the predetermined threshold amount, the data chunks are read 46 from the disk drives 4 and stored in the buffer memory 8 without any reconstruction operation.

Regardless of the result of the decision 38, following blocks 42 and 46, the data chunks are transmitted 44. The data chunks being transmitted are supplied to the communication network from the buffer memory 8 via the switching unit 14. The actual transmission of the data chunks is controlled by scheduling provided by the video storage server 2. FIGS. 5 and 6 illustrate one of numerous possible scheduling schemes that may be used with the invention.

Finally, a decision 48 is made based on whether or not there are additional data chunks to be transmitted. If there are no additional blocks of data chunks to be transmitted, the playback procedure 32 is completed. On the other hand, if there are additional blocks of data chunks to be transmitted, the playback procedure 32 repeats blocks 34–46 using the next set of k+1 disk drives which store the next parity group of data chunks of the data stream being transmitted. The drives within the sets of k+1 disk drives vary in accordance with the randomized disk drive sequence with which the data stream was recorded.

Figure 4:
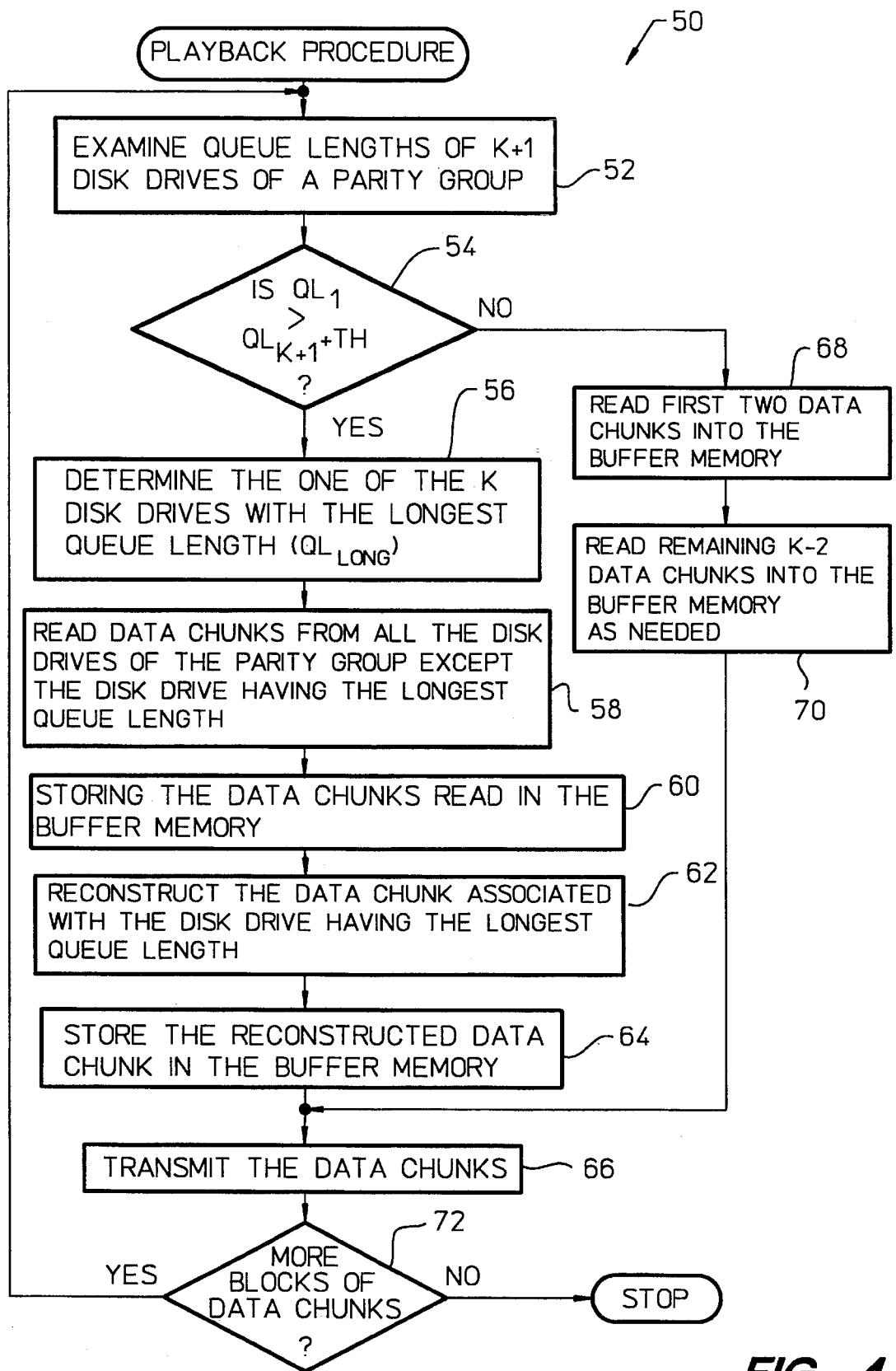
FIG. 4 is a block diagram of a playback procedure according to another embodiment of the invention.

FIG. 4 is a block diagram of the playback procedure 50 according to another embodiment of the invention. The playback procedure 50 begins by examining 52 queue lengths of k+1 disk drives holding the chunks comprising a parity group. A parity group includes k disk drives, each of which stores a chunk of data associated with a block of the video data, and a $k+1^{th}$ disk drive which stores the parity chunk associated with the block of the video data.

Next, a decision 54 is made based on a comparison of the queue lengths of the k+1 disk drives holding the chunks of a parity group. If the queue length of the first drive ($QL_1$) is greater than the queue length of the parity drive ($QL_{k+1}$) plus a predetermined threshold amount, then the invention operates the video storage server 2 more efficiently than conventionally obtained. In this embodiment, the comparison uses the queue length of the first queue of a parity group because it is this queue that holds the data needed soonest for the data stream to be transmitted. The situation of the other queues of the parity group may change substantially by the time these chunks are read for streaming. In any case, when decision 54 is answered in the affirmative, the one of the k disk drives with the longest queue length ($QL_{LONG}$) is determined 56. Then, data chunks are read 58 from all the disk drives of the parity group, except the disk drive having the longest queue length. The data chunks read 58 are stored 60 in the buffer memory 8.

The priority rule for servicing requests in this embodiment is "earliest streaming time first." When reconstruction is to occur, the "streaming time" for priority is the earlier of the chunk's own streaming time and that of the reconstructed chunk. However, placing a request in a queue some time in advance of its streaming time, even though its scheduling priority depends only on its streaming time, serves two purposes: (i) it provides a hint about the future load on the associated disk, thereby discouraging arrivals of new requests, and (ii) the server is less likely to become idle.

Next, the data chunk associated with the disk drive having the longest queue length ($QL_{LONG}$) is reconstructed 62 using the data chunks from all of the other disk drives within the parity group. The data chunks from the other disk drives within the parity group were previously read 58 and stored 60 in the buffer memory 8. Using these data chunks, the playback procedure 50 is able to reconstruct the data chunk corresponding to the disk drive having the longest queue length. The reconstructed data chunk is then stored 64 in the buffer memory. Hence, instead of reading the data chunk from the disk drive having the longest queue length, the video storage server 2 reconstructs the data chunk from the other data chunks and stores it into the buffer memory 8. Preferably, the reconstructed data chunk is stored in the buffer memory 8 in place of the parity chunk that is no longer needed. Consequently, the disk drive having the longest queue length is not utilized to transmit this particular data chunk. As a result, load balancing occurs and the system enables the disk drive having the longest queue length to recover from its long delays.

On the other hand, if the decision 54 is answered in the negative, the first two data chunks of the data stream are read 68 into the buffer memory 8. Thereafter, the remaining k–2 data chunks of the parity group are read 70 into the buffer memory 8 as they are needed. In fact, the remaining k–2 data chunks need only be requested in time so that they are read before needed for streaming. This scheduling approach minimizes the amount of buffer storage required to support the data stream. The advantage of requesting two chunks of data initially (or having a spare chunk in the buffer) is that the time at the boundary between parity groups is the most vulnerable one for the buffer to become empty.

Regardless of the result of decision 54, following blocks 64 or 70, the data chunks are transmitted over the communications network to one or more destinations via the switching unit 14. Following block 66, a decision 72 is made based on whether or not there are additional blocks of data chunks to be transmitted. If there are no more blocks of data chunks to be transmitted, the playback procedure 50 is completed. Otherwise, blocks 52–70 are repeated for each of the remaining blocks of data chunks to be transmitted.

Variations of the above-described playback procedure 32 and 50 are also possible depending on the particular optimization desired. For instance, the decision 54 in FIG. 4 could be made more complicated by first comparing the queue length of the first drive ($QL_1$) with a threshold amount to see if the queue length is large enough to warrant any action, and if it is then performing the decision 54 to determine whether reconstruction will provide some benefit given the overhead associated with reconstruction.

Although not discussed in FIGS. 3 and 4, in the case where one of the k disk storing a chunk of the parity group fails, then reconstruction of the chunk on the faulty disk is reconstructed regardless of queue lengths. The above processing can include this case by setting the queue length of a faulty disk to a relatively large number such that the queue length comparisons would always cause the chunk to reconstruct.

FIG. 5 is a diagram illustrating memory buffer utilization in a case where reconstruction is not necessary. The horizontal axis represents time, and the width of rectangles represents the time required for playing one chunk at the video rate. The stacked rectangles in each time slot represent the chunks that are in the memory buffer (i.e., equal to the duration of playing a chunk). In the example illustrated, the reading and streaming of a 5-chunk parity group, starting with chunk n+1, is considered. When the group is considered, the buffer still contains chunks n–1 and n, which belong to the previous parity group. At this time, chunks n+1 and n+2 are requested and, reflecting the situation that maximizes buffer requirement, both are received immediately. One time slot later, chunk n–1 has been played and is therefore gone, and chunk n+3 is requested and again received immediately, so buffer size remains constant. After four time slots, all five chunks of the parity group have been requested and received, so no new request is made and the buffer occupancy drops to one. In the following time slot, the next parity group is considered. Again, a decision is made not to reconstruct, so the first two chunks, n+6 and n+7, are requested and received, raising the buffer occupancy to four again..

FIG. 6 is a diagram illustrating the memory buffer utilization in a case where reconstruction is utilized to avoid a bad disk or a long queue. The example illustrated depicts the case wherein k chunks are requested and received immediately (k–1 data and one parity chunk), and again there were two chunks (n and n–1) in the buffer prior to this. In the remainder of the parity group's streaming time, no more chunks are requested, so buffer occupancy drops by one chunk each time slot.

Both the policy for dispatching read-requests and the priority of servicing requests shows in FIGS. 4–6 are merely preferred embodiments. The invention more broadly includes any scheduling policies and priorities which take into account playing order, the need to reconstruct, buffering requirements and ramifications of receiving data too early and having to buffer it. This, for example, includes policies that permit changing of a decision as to whether to use the parity (redundant) chunk for any given group of k data chunks even after requests have been placed in queues, as well as decision policies that examine the priorities of queued requests and not merely the queue lengths. Specifically, although the embodiments discussed above compare the longest queue length or first queue length with the parity queue length, other criteria for making the decision to reconstruct the chunk of data can be used. For example, the average length of a data queue versus the length of the parity queue, the amount of work to service the queued requests, or scheduling priorities of the queued requests and their deadlines could also be used.

The above-described embodiments discussed above use a parity scheme to compensate for single-disk failures or high queue lengths. In particular, the embodiments used a single parity chunk to implement the error correcting code for each k chunks of data. This approach can be readily generalized to use other error-correcting codes, and it is not necessary to dedicate specific disks to the role of storing error-correction information. For example, the inventive concept can be generalized (from k+1 chunks) to k+r chunks, where r represent the number of parity chunks for each k chunks of data. Other error-correction codes could also be used as would be well understood by those in the art.

There is a tradeoff between bandwidth and buffer requirements. In the embodiments discussed above, any given chunk of data was read at most once. Alternatively, one may save buffer space by reading from the disk drive twice a data chunk that is required for reconstruction. It is read once for the purpose of reconstruction and once when it is actually needed for streaming (the order depends on the relative positions of this and the reconstructed chunk in the stream).

In the embodiment of the invention shown and described with reference to FIG. 1, the reconstruction of missing data is carried out by reading data chunks from the buffer memory 8 into the reconstruction unit 10, and then writing the reconstructed data chunk in the buffer memory 8. The reconstructed data may or may not overwrite the redundant data chunk. It is nevertheless recognized that reconstruction could also occur on the way from the disk drive to the buffer memory 8 as well as on the way from the buffer memory 8 to the communications network. Also, reconstruction may be carried out on the basis of pieces smaller than a chunk rather than for the entire chunks. Finally, reconstruction could be carried out incrementally by storing partial results for multiple ongoing reconstructions either in the shared memory buffer 8 or in storage memory of the reconstruction unit 10.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A server system for storing and supplying data, said system comprising:
    a plurality of disk drives, each of said disk drives storing data;
    a buffer memory, operatively connected to said disk drives, for temporarily storing a portion of the data from said disk drives which is soon to be supplied;
    a reconstruction unit, operatively connected to said buffer memory, for reconstructing a portion of the data from at least one of said disk drives using a portion of the data from a plurality of the remaining disk drives so that at least one of said disk drives can be bypassed;
    queues associated with said disk drives;
    a control unit for controlling said server system, said control unit examines said queues to obtain queue information and then decides based on the queue information whether to bypass any of said disk drives; and
    an output unit for outputting the data from either or both of said buffer memory and said reconstruction unit.

2. A server system as recited in claim 1, wherein said server system is a video storage server and the data being stored is video data.

3. A server system as recited in claim 1, wherein each of the queues are associated with one of said disk drives.

4. A server system as recited in claim 1, wherein the data stored on said disk drives is partitioned into sets of data chunks, within each set the data chunks are equi-sized, and each of the data chunks of a given set are stored on a different one of said disk drives.

5. A server system as recited in claim 4, wherein each of the sets of data chunks contains the same number of data chunks.

6. A server system as recited in claim 4, wherein the data chunks of all the sets are equi-sized.

7. A server system as recited in claim 4, wherein said control unit comprises:
    means for examining congestion at each of the queues; and
    means for identifying among said disk drives holding the data chunks of a given set of data chunks the one of said disk drives associated with the queue with the most congestion.

8. A server system as recited in claim 7,
    wherein each of the sets of the data chunks includes a plurality of data chunks and at least one reconstruction chunk, and
    wherein said reconstruction unit reconstructs at least one data chunk of a set of the data chunks when the amount of congestion at the queue associated with the disk drive storing the at least one data chunk is greater than the congestion at the queue associated with the disk drive storing at least one of the reconstruction chunks by more than a predetermined amount.

9. A server system as recited in claim 7,
    wherein each of the sets of the data chunks includes a plurality of data chunks and at least one reconstruction chunk, and
    wherein said reconstruction unit reconstructs the data chunk associated with the disk drive associated with a first data chunk of a set of the data chunks when the amount of congestion at the queue associated with the disk drive storing the first data chunk is greater than the congestion at the queue associated with the disk drive storing at least one of the reconstruction chunks by more than a predetermined amount.

10. A server system as recited in claim 7,
    wherein each of the sets of the data chunks includes a plurality of data chunks and at least one reconstruction chunk, and
    wherein said reconstruction unit reconstructs the data chunk associated with the disk drive associated with the queue with the most congestion when the amount of congestion at the queue with the most congestion is greater than the congestion at the queue associated with the disk drive storing at least one of the reconstruction chunks by more than a predetermined amount.

11. A server as recited in claim 10, wherein the congestion at the queues is examined by considering at least one of queue length and scheduling priorities.

12. A server system as recited in claim 1, wherein the data is partitioned into sets of k equal-size data chunks, r redundancy chunks are created for each set of k data chunks, such that the data of any r of the k data chunks can be reconstructed from that of a plurality of remaining data chunks and redundancy chunks of the same set of chunks, and the k data chunks and the r redundancy chunks of each set are stored on k+r different drives, where k and r are positive integers.

13. A server system as recited in claim 12,
    wherein r equals 1, and the single redundancy chunk for each set of k data chunks contains parity information, and
    wherein said reconstruction unit reconstructs a data chunk stored on said disk drive being bypassed using the parity information and other data from the other disk drives.

14. A server system as recited in claim 1, wherein said control unit further examines operational status of said disk drives to obtain operational information and decides whether to bypass any of said disk drives by using both the queue information and the operational information.

15. A method for supplying data streams from disk drives to a destination, the data streams are formed frown video data obtained from the disk drives, the video data is partitioned into blocks, each block is then partitioned into a set of data chunks which are stored on a set of different ones of the disk drives, at least one redundancy chunk for each set of data chunks is stored on another of the disk drives, one chunk per disk drive, and the data chunks of each of the blocks of the video data along with the at least one redundancy chunk form a group, said method comprising:

(a) maintaining a queue of access requests for each of the disk drives;

(b) examining queue state information of the queues of the disk drives associated with a group;

(c) selectively reconstructing at least one of the data chunks of the set from the other data chunks of the set and the associated reconstruction chunk based on both the queue state information corresponding to the reconstruction chunk and the queue state information corresponding to at least one of the data chunks; and (d) supplying the data chunks to the destination.

16. A method as recited in claim 15, wherein the storing of the data chunks to the disk drives is done in accordance with a disk drive sequence, and to form the disk drive sequence, said method creates a sequence of disk numbers which is aperiodic or has a period which is much larger than the number of disk drives, guarantee an essentially equal number of recurrences of every disk number within any subsequence of the sequence having at least some prespecified length, and ensures at least a certain prespecified distance between recurrences of the same disk number.

17. A method as recited in claim 15, wherein said reconstructing (c) determines whether or not to reconstruct at least one of the data chunks by comparing, for the group, the queue state information corresponding to the reconstruction chunk relative to the queue state information corresponding to at least one of the data chunks.

18. A method as recited in claim 15, wherein said reconstructing (c) determines whether or not to reconstruct at least one of the data chunks based on both the queue state information corresponding to the first data chunk within the group and the queue state information corresponding to the reconstruction chunk.

19. A method as recited in claim 15, wherein the queue state information is queue length.

20. A method as recited in claim 19, wherein said reconstructing (c) determines whether or not to reconstruct at least one of the data chunks based on both the queue length corresponding to the reconstruction chunk and the longest queue length among the queue lengths of the data chunks of the group.

21. A method as recited in claim 15, wherein said reconstructing (c) comprises (c1) dispatching the access requests to said disk drives, and wherein the priority with which the access requests are dispatched to the corresponding disk drive depends on the time at which a data chunk is required for reconstruction of a redundancy chunk or for said supplying (d) of the data chunk.

22. A method as recited in claim 15, wherein the plurality of data chunks within the group are of equal size.

* * * * *